United States Patent
Lee et al.

(10) Patent No.: US 6,524,495 B1
(45) Date of Patent: Feb. 25, 2003

(54) REFRIGERANT MIXTURE COMPRISING DIFLUROMETHANE, PENTAFLUROETHANE AND 1,1,1-TRIFLUOROETHANE

(75) Inventors: Byung Gwon Lee, Seoul (KR); Jong Sung Lim, Seoul (KR); Kun You Park, Seoul (KR); Moon Jo Chung, Seoul (KR); Seong Joon Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 107 days.

(21) Appl. No.: 09/710,578

(22) Filed: Nov. 9, 2000

(30) Foreign Application Priority Data

Nov. 10, 1999 (KR) .............................................. 99-49666

(51) Int. Cl.$^7$ ................................................ C09K 5/04
(52) U.S. Cl. .................................................... 252/67
(58) Field of Search ........................................... 252/67

(56) References Cited

U.S. PATENT DOCUMENTS 5,736,062 A * 4/1998 Basile et al. ................. 252/67
6,176,094 B1 * 1/2001 Ohta et al. .................. 62/114

FOREIGN PATENT DOCUMENTS

WO    WO 94/00529    * 1/1994
WO    WO 97/15637    * 5/1997

* cited by examiner

*Primary Examiner*—John Hardee
(74) *Attorney, Agent, or Firm*—Darby & Darby

(57) ABSTRACT

A novel refrigerant composition useful as a substitute for HCFC-22, comprising a first constituent of difluoromethane ($CH_2F_2$, HFC-32); a second constituent of pentafluoroethane ($CHF_2CF_3$, HFC-125); a third constituent of 1,1,1-trifluoroethane ($CH_3CF_3$, HFC-143a); a fourth constituent selected from the group consisting of cyclopropane ($C_3H_6$, RC-270), 1,1,1,2,3,3,3-heptafluoropropane ($CF_3CHFCF_3$, HFC-227ea), 1,1,1,2,2-pentafluoropropane ($CH_3CF_2CF_3$, HFC-245cb), isobutane ($CH(CH_3)_2CH_3$, R-600a), octafluorocyclobutane ($C_4F_8$, RC-318), 1,1,1,2,3,3-hexafluoropropane ($CHF_2CHFCF_3$, HFC-236ea), butane ($C_4H_{10}$, R-600), bis(difluoromethyl)ether ($CHF_2OCHF_2$, HFE-134) and pentafluoroethylmethylether ($CF_3CF_2OCH_3$, HFE-245).

9 Claims, No Drawings

REFRIGERANT MIXTURE COMPRISING DIFLUROMETHANE, PENTAFLUROETHANE AND 1,1,1-TRIFLUOROETHANE

BACKGROUND OF THE INVENTION

1. Field of the Invention

The present invention relates to a refrigerant mixture which is useful as a substitute for chlorodifluoromethane (CHClF$_2$, HCFC-22). More particularly, the present invention relates to a refrigerant composition which is useful as a substitute for HCFC-22, which comprises a first constituent of difluoromethane (CH$_2$F$_2$, HFC-32); a second constituent of pentafluoroethane (CHF$_2$CF$_3$, HFC-125); a third constituent of 1,1,1-trifluoroethane (CH$_3$CF$_3$, HFC-143a); a fourth constituent selected from the group consisting of cyclopropane (C$_3$H$_6$, RC-270), 1,1,1,2,3,3,3-heptafluoropropane (CF$_3$CHFCF$_3$, HFC-227ea), 1,1,1,2,2-pentafluoropropane (CH$_3$CF$_2$CF$_3$, HFC-245cb), isobutane (CH(CH$_3$)$_2$CH$_3$, R-600a), octafluorocyclobutane (C$_4$F$_8$, RC-318), 1,1,1,2,3,3-hexafluoropropane (CHF$_2$CHFCF$_3$, HFC-236ea), butane (C$_4$H$_{10}$, R-600), bis(difluoromethyl)ether (CHF$_2$OCHF$_2$, HFE-134) and pentafluoroethylmethylether (CF$_3$CF$_2$OCH$_3$, HFE-245).

2. Description of the Background Art

As is well known, CFC compounds have been restricted in production and use in accordance with the Montreal Protocol because they have been found as a main factor in contributing to the destruction of the ozone layer. In advanced nations, the use of such CFC compounds has already been banned since 1996. It is also known that HCFC-based compounds such as HCFC-22 have considerable effects in causing damage to the ozone layer even though this effect is less severe than those of the CFC compounds. For this reason, a restriction has been made to gradually reduce the use of such HCFC-based compounds. A plan has also been made to ban the use of HCFC-based compounds about the year 2020.

This has resulted in a number of world-wide research efforts to produce substitute materials coping with the restriction in use of HCFC-22 which will be more severe in the future. The representative examples of a substitute refrigerant mixtures are HFC-407C and HFC-410A proposed by the American Society of Heating. Refrigerating and Air-Conditioning Engineers (ASHRAE). HFC-407C is a refrigerant mixture of HFC-32/125/134a in a ratio of 23/25/52 (based on weight percent). Meanwhile, HFC-410A is a refrigerant mixture of HFC-32/125 in a ratio of 50/50 (based on weight percent).

In addition, U.S. Pat. No. 5,080,823 discloses a mixed refrigerant composition of HFC-143a/opropane (C$_3$H$_8$), U.S. Pat. No. 5,185,094: HFC-32/125/134a, U.S. Pat. No. 5,211,867: HFC-125/143a, U.S. Pat. No. 5,234,613: HFC-32/propane, U.S. Pat. No. 5,236,611: PFC-218/ HFC-143a, U.S. Pat. No. 5,290,466: HFC-32/134a/134, U.S. Pat. No. 5,340,490: HFC-23/CO$_2$ or HFC-23/116/CO$_2$, U.S. Pat. No. 5,403,504: HFC-125/32, U.S. Pat. No. 5,429,760: HFC-23/134a, U.S. Pat. No. 5,538,660: HFC-32/HFC-134a/FC-14 or HFC-32/HFC-134a/PFC-218, and U.S. Pat. No. 5,643,492: HFC-32/125/134a.

Also, Japanese Patent Laid-open Publication No. 172386/1991 discloses a mixed refrigerant composition of HFC-32/125/152, Japanese Patent Laid-open Publication No. 170594/1991: HFC-23/125/134a, Japanese Patent Laid-open Publication No. 170592/1991: HFC-32/143a/152a, Japanese Patent Laid-open Publication No. 170593/1991: HFC-23/125/32, Japanese Patent Laid-open Publication No. 170591/1991: HFC-23/143a/134a, Japanese Patent Laid-open Publication No. 170590/1991: HFC-125/134a/32, Japanese Patent Laid-open Publication No. 170589/1991: HFC-23/143a/152a, Japanese Patent Laid-open Publication No. 170588/1991: HFC-125/143a/134a, Japanese Patent Laid-open Publication No. 170587/1991: HFC-32/134a/152a, Japanese Patent Laid-open Publication No. 170586/1991: HFC-32/143a/134a, Japanese Patent Laid-open Publication No. 170585/1991: HFC-32/125/134a, Japanese Patent Laid-open Publication No. 170584/1991: HFC-23/134a/152a, Japanese Patent Laid-open Publication No. 170583/1991: HFC-125/143a/32, Japanese Patent Laid-open Publication No. 222893/1992: HFC-132/152a, Japanese Patent Laid-open Publication No. 154887/1992: HFC-134/152a , Japanese Patent Laid-open Publication No. 117645/1993: HFC-23/134a/propane, Japanese Patent Laid-open Publication No. 117643/1993: HFC-125/134a/propane, Japanese Patent Laid-open Publication No. 65561/1994: HFC-23/152a/PFC-218, Japanese Patent Laid-Open Publication No. 128872/1994: HFC-32/PFC-218, Japanese Patent Laid-Open Publication No. 220433/1994: HFC-32/125/RC-318, Japanese Patent Laid-Open Publication No. 173462/1995: HFC-143a/125/134a/heptane (C$_7$H$_{16}$), Japanese Patent Laid-open Publication No. 176537/1996: PFC-218/RC-270/HFC-152a, Japanese Patent Laid-open Publication No. 151569/1996: propane/RC-270/HFC-34a, Japanese Patent Laid-open Publication No. 127767/1996: HFC-32/134a/RC-318, Japanese Patent Laid-open Publication No. 25480/1997: HFC-32/134a/125/isobutane, Japanese Patent Laid-open Publication No. 59611/1997: HFC-134a/isobutane, Japanese Patent Laid-Open Publication No. 208941/1997: HFC-32/152a/125/RC-270, and Japanese Patent Laid-open Publication No. 21664/1997: HFC-125/143a|134a/RC-270.

Also, Korean Patent Publication No. 93-10514 (Application No. 90-19594) discloses a mixed refrigerant composition of HFC-23/132/152a, HFC-23/125/152a, HFC-32/143a152a, HFC-125/143a/152a, HFC-32/125/125a, HFC-23/143a/152a, or HFC-23/125/152a, Korean Patent Publication No. 93-10515 (Application No. 90-19596): HFC-23/32/134, HFC-23/32/134a, HFC-23/125/134a, HFC-23/125/134, HFC-32/125/134, HFC-23/143a/134a, HFC-32/125/134a, HFC-125/143a/134a, or HFC-125/143a/134, Korean Patent Laid-Open Publication No. 96-4485 (Application No. 95-21221): HFC-32/23/134a, Korean patent Laid-open Publication No. 95-704438 (Application No. 95-701865): HFC-32/125/134a, Korean patent Laid-open Publication No. 96-701168 (Application No. 95-704038): HFC-227ea/HFC-152a, and Korean Patent Laid-open Publication No. 97-704853 (Application No. 97-700436): HFC-134a/HCFC-124/butane.

SUMMARY OF THE INVENTION

Therefore, an object of the present invention is to provide a novel refrigerant mixture which is useful as a substitute for HCFC-22. That is, the present invention has an object to provide a refrigerant composition produced by mixing additionally one component of RC-270, HFC-227ea, HFC-245cb, R-600a, RC-318, HFC-236ea, R-600, HFE-134 and HFE-245 with a mixture of HFC-32, HFC-125 and HFC-143a, thereby producing a composition capable of exhibiting properties similar to HCFC-22.

DETAILED DESCRIPTION OF THE PREFERRED EMBODIMENTS

The present invention relates to a refrigerant composition which is useful as a substitute for HCFC-22, which comprises a first constituent of difluoromethane (CH$_2$F$_2$, HFC-32); a second constituent of pentafluoroethane (CHF$_2$CF$_3$, HFC-125); a third constituent of 1,1,1-trifluoroethane ($CH_3CF_3$, HFC-143a); a fourth constituent selected from the group consisting of cyclopropane ($C_3H_6$, RC-270), 1,1,1,2,3,3,3-heptafluoropropane ($CF_3CHCF_3$, HFC-227ea), 1,1,1,2,2-pentafluoropropane ($CH_3CF_2CF_3$, HFC-245cb), isobutane ($CH(CH_3)_2CH_3$, R-600a), octafluorocyclobutane ($C_4F_8$, RC-318), 1,1,1,2,3,3-hexafluoropropane ($CHF_2CHCF_3$, HFC-236ea), butane ($C_4H_{10}$, R-600), bis(difluoromethyl)ether ($CHF_2OCHF_2$, HFE-134) and pentafluoroethylmethylether ($CF_3CF_2OCH_3$, HFE-245).

It is preferred that the refrigerant composition of the present invention comprises a first constituent of 15 to 95% by weight difluoromethane ($CH_2F_2$, HFC-32); a second constituent of an amount up to 60% by weight pentafluoroethane ($CHF_2CF_3$, HFC-125); a third constituent of an amount up to 70% by weight 1,1,1-trifluoroethane ($CH_3CF_3$, HFC-143a); a fourth constituent of an amount up to 50% by weight comprising one selected from the group consisting of cyclopropane ($C_3H_6$, RC-270), 1,1,1,2,3,3,3-heptafluoropropane ($CF_3CHCF_3$, HFC-227ea), 1,1,1,2,2-pentafluoropropane ($CH_3CF_2CF_3$, HFC-245cb), isobutane ($CH(CH_3)_2CH_3$, R-600a), octafluorocyclobutane ($C_4F_8$, RC-318), 1,1,1,2,3,3-hexafluoropropane ($CHF_2CHCF_3$, HFC-236ea), butane ($C_4H_{10}$, R-600), bis(difluoromethyl)ether ($CHF_2OCHF_2$, HFE-134) and pentafluoroethylmethylether ($CF_3CF_2OCH_3$, HFE-245).

In accordance with the present invention, the refrigerant composition as mentioned above is applied to a refrigeration system which comprises a compressor, a condenser, an expansion valve, and an evaporator in order to evaluate the coefficient of performance (COP), the volumetric capacity of refrigereant (VC), and pressures in the compressor and evaporator. The novel refrigerant mixture according to the present invention is evaluated to be substantially equivalent to HFC407C or HFC-410A in terms of performance. Accordingly, the refrigerant mixture of the present invention is useful as a substitute for HCFC-22.

Where the refrigerant composition of the present invention includes HFC-32, HFC-125, HFC-143a and RC-270, the composition comprises 15 to 60% by weight of HFC-32, an amount up to 50% by weight of HFC-125, 20 to 70% by weight of HFC-143a and an amount up to 15% by weight of RC-270, and preferably, the composition comprises 25 to 45% by weight of HFC-32, 2 to 35% is by weight of HFC-125, 28 to 60% by weight of HFC-143a and an amount up to 10% by weight of RC-270.

Where the refrigerant composition of the present invention includes HFC-32, HFC-125, HFC-143a and HFC-227a, the composition comprises 20 to 60% by weight of HFC-32, an amount up to 60% by weight of HFC-125, an amount up to 70% by weight of HFC-143a and an amount up to 50% by weight of HFC-227a, and preferably, the composition comprises 28 to 50% by weight of HFC-32, 2 to 50% by weight of HFC-125, 5 to 60% by weight of HFC-143a and an amount up to 40% by weight of HFC-227ea.

Where the refrigerant composition of the present invention includes HFC-32, HFC-125, HFC-143a and HFC-245cb, the composition comprises 20 to 90% by weight of HFC-32, an amount up to 60% by weight of HFC-125, an amount up to 60% by weight of HFC-143a and an amount up to 50% by weight of HFC-245cb, and preferably, the composition comprises 30 to 85% by weight of HFC-32, 2 to 45% by weight of HFC-125, 3 to 50% by weight of HFC-143a and an amount up to 40% by weight of HFC-245cb.

Where the refrigerant composition of the present invention includes HFC-32, HFC-125, HFC-143a and R-600a, the composition comprises 30–60% by weight of HFC-32, an amount up to 45% by weight of HFC-125, 15 to 50% by weight of HFC-143a and an amount up to 20% by weight of R-600a, and preferably, the composition comprises 38 to 50% by weight of HFC-32, 5 to 35% by weight of HFC-125, 20 to 43% by weight of HFC-143a and an amount up to 15% by weight of R-600a.

Where the refrigerant composition of the present invention includes HFC-32, HFC-125, HFC-143a and RC-318, the composition comprises 20 to 60% by weight of HFC-32, an amount up to 45% by weight of HFC-125, 10 to 50% by weight of HFC-143a and an amount up to 20% by weight of RC-318, and preferably, the composition comprises 30 to 48% by weight of HFC-32, 10 to 35% by weight of HFC-125, 20 to 40% by weight of HFC-143a and an amount up to 15% by weight of RC-318.

Where the refrigerant composition of the present invention includes HFC-32, HFC-125, HFC-143a and HFC-236ea, the composition comprises 20 to 85% by weight of HFC-32, an amount up to 40% by weight of HFC-125, an amount up to 60% by weight of HFC-143a and an amount up to 30% by weight of HFC-236ea, and preferably, the composition comprises 30 to 75% by weight of HFC-32, 5 to 30% by weight of HFC-125, 5 to 48% by weight of HFC-143a and an amount up to 20% by weight of HFC-236ea.

Where the refrigerant composition of the present invention includes HFC-32, HFC-125, HFC-143a and R-600, the composition comprises 25 to 70% by weight of HFC-32, an amount up to 60% by weight of HFC-125, an amount up to 40% by weight of HFC-143a and an amount up to 20% by weight of R-600, and preferably, the composition comprises 35 to 60% by weight of HFC-32, 5 to 50% by weight of HFC-125, 5 to 33% by weight of HFC-143a and an amount up to 12% by weight of R-600.

Where the refrigerant composition of the present invention includes HFC-32, HFC-125, HFC-143a and HFE-134, the composition comprises 30 to 95% by weight of HFC-32, an amount up to 50% by weight of HFC-125, an amount up to 40% by weight of HFC-143a and an amount up to 15% by weight of HFE-134, and preferably, the composition comprises 40 to 88% by weight of HFC-32, 2 to 40% by weight of HFC-125, 2 to 30% by weight of HFC-143a and an amount up to 10% by weight of HFE-134.

Where the refrigerant composition of the present invention includes HFC-32, HFC-125, HFC-143a and HFE-245, the composition comprises 30 to 90% by weight of HFC-32, an amount up to 50% by weight of HFC-125, an amount up to 45% by weight of HFC-143a and an amount up to 15% by weight of HFE-245, and preferably, the composition comprises 40 to 85% by weight of HFC-32, 5 to 40% by weight of HFC-125, 5 to 38% by weight of HFC-143a and an amount up to 10% by weight of HFE-245.

The present invention will now be described in more detail referring to the following examples. It is to be understood that these examples are merely illustrative and it is not intended to limit the scope of the present invention to these examples.

EXAMPLE

Evaluation of Performance of Refrigerant Composition

In order to evaluate the performance of the refrigerant mixture according to the present invention, a refrigeration system including a compressor, a condenser, an expansion valve, and an evaporator was used which has the following performance evaluation conditions:

Refrigeration capacity: 2 kW

Overall Heat Transfer coefficient in evaporator (UA): 0.20 kW/K

Overall Heat Transfer coefficient in condenser (UA): 0.24 kW/K

Degree of subcooling in condenser: 5° C.

Degree of superheating in evaporator: 5° C.

Efficiency of compressor: 0.8

Temperature of secondary fluid at inlet of condenser: 25° C.

Temperature of secondary fluid at outlet of condenser: 35° C.

Temperature of secondary fluid at inlet of evaporator: 15° C.

Temperature of secondary fluid at outlet of evaporator: 5° C.

Under the above conditions, the refrigerant compositions according to the present invention were compared to HCFC-22, HFC-407C and HFC-410A in terms of the main factors for evaluating the refrigerant performance, that is, the coefficient of performance (COP), the volumetric capacity of refrigerant (VC), and evaporator pressure ($P_L$), and condenser pressure ($P_H$)

Comparative Examples 1 to 3

HCFC-22, HFC-407C and HFC-410A compared to the refrigerant compositions of the present invention have the following evaluated performances.

those of HCFC-22. It should be noted that a composition exhibiting a refrigerant performance defined as above is useful as a substitute refrigerant for HCFC-22. Accordingly, the performances of the refrigerant mixtures according to the present invention were evaluated and compared with the above evaluated results.

Example 1. Evaluation of Performance of Refrigerant Mixture of HFC-32/HFC-125/HFC-143a/RC-270

The evaluated performances of the refrigerant mixture comprising HFC-32/HFC-125/HFC-143a/RC-270 at different weight percent of each constituents are described in Table 2, respectively. Referring to Table 2, it can be found that the performance of the compositions indicated in each item of Table 2 fall within the range between those of HFC407C and HFC-410A, so that the tested refrigerant mixture is useful as a substitute for HCFC-22.

TABLE 1

Evaluated performance of HCFC-22, HFC-407C and HFC-410A

| Comparative example No. | refrigerant | HCFC-22 (wt %) | HFC-32 (wt %) | HFC-125 (wt %) | HFC-134a (wt %) | COP | VC (kJ/m³) | $P_L$ (kPa) | $P_H$ (kPa) |
|---|---|---|---|---|---|---|---|---|---|
| 1 | HCFC-22 | 100 | — | — | — | 5.45 | 3338 | 455 | 1254 |
| 2 | HFC-407C | — | 23 | 25 | 52 | 4.98 | 3412 | 460 | 1445 |
| 3 | HFC-410A | — | 50 | 50 | — | 5.31 | 5117 | 730 | 1993 |

TABLE 2

Evaluated performance of refrigerant mixture of HFC-32/HFC-125/HFC-143a/RC-270

| Composition No. | HFC-32 (wt %) | HFC-125 (wt %) | HFC-143a (wt %) | RC-270 (wt %) | COP | VC (kJ/m³) | $P_L$ (kPa) | $P_H$ (kpa) |
|---|---|---|---|---|---|---|---|---|
| 1 | 40 | 30 | 30 | 0 | 5.20 | 4797 | 701 | 1919 |
| 2 | 30 | 35 | 30 | 5 | 5.06 | 4702 | 714 | 1949 |
| 3 | 35 | 30 | 30 | 5 | 5.09 | 4820 | 726 | 1975 |
| 4 | 25 | 35 | 35 | 5 | 4.98 | 4548 | 698 | 1923 |
| 5 | 40 | 30 | 28 | 2 | 5.17 | 4868 | 718 | 1957 |
| 6 | 42 | 25 | 30 | 3 | 5.18 | 4929 | 728 | 1973 |
| 7 | 42 | 23 | 32 | 3 | 5.18 | 4922 | 728 | 1970 |
| 8 | 42 | 18 | 37 | 3 | 5.20 | 4910 | 726 | 1959 |
| 9 | 42 | 10 | 45 | 3 | 5.20 | 4889 | 724 | 1948 |
| 10 | 42 | 5 | 50 | 3 | 5.20 | 4877 | 724 | 1942 |
| 11 | 42 | 0 | 55 | 3 | 5.20 | 4865 | 723 | 1937 |
| 12 | 45 | 0 | 55 | 0 | 5.26 | 4814 | 702 | 1891 |
| 13 | 33 | 0 | 60 | 7 | 5.11 | 4759 | 726 | 1941 |
| 14 | 33 | 0 | 58 | 7 | 5.11 | 4761 | 727 | 1942 |
| 15 | 28 | 2 | 60 | 10 | 5.04 | 4677 | 725 | 1940 |

Referring to Table 1, it can be seen that HFC-407C exhibits a COP slightly less than that of HCFC-22 while exhibiting a VC and pressures similar to those of HCFC-22. On the other hand, HFC-410A has a COP similar to that of HCFC-22 while exhibiting pressures slightly higher than Example 2. Evaluation of Performance of Refrigerant Mixture of HFC-32/HFC-125/HFC-143a/HFC-227ea The evaluated performances of the refrigerant mixture comprising HFC-32/HFC-125/HFC-143a/HFC-227ea at different weight percent of each constituents are described in Table 3, respectively. Referring to Table 3, it can be found that the performance of the compositions indicated in each item of Table 2 fall with ranges between those of HFC407C and HFC-410A, so that the tested refrigerant mixture is useful as a substitute for HCFC-22.

that the performance of the compositions indicated in each item of Table 2 fall within the ranges between those of HFC407C and HFC-410A, so that the tested refrigerant mixture is useful as a substitute for HCFC-22.

TABLE 3

Evaluated performance of refrigerant mixture of HFC-32/HFC-125/HFC-143a/HFC-277ea

| Composition No. | HFC-32 (wt %) | HFC-125 (wt %) | HFC-143a (wt %) | HFC-227ea (wt %) | COP | VC (kJ/m$^3$) | $P_L$ (kPa) | $P_H$ (kpa) |
|---|---|---|---|---|---|---|---|---|
| 1 | 28 | 2 | 60 | 10 | 5.04 | 4322 | 644 | 1803 |
| 2 | 35 | 0 | 60 | 5 | 5.14 | 4554 | 673 | 1847 |
| 3 | 45 | 10 | 45 | 0 | 5.26 | 4841 | 705 | 1904 |
| 4 | 30 | 30 | 35 | 5 | 5.06 | 4493 | 667 | 1865 |
| 5 | 30 | 40 | 28 | 2 | 5.06 | 4554 | 677 | 1891 |
| 6 | 40 | 5 | 50 | 5 | 5.20 | 4688 | 687 | 1875 |
| 7 | 35 | 33 | 25 | 7 | 5.13 | 4631 | 679 | 1891 |
| 8 | 40 | 15 | 30 | 15 | 5.18 | 4642 | 674 | 1872 |
| 9 | 50 | 15 | 15 | 20 | 5.26 | 4866 | 695 | 1917 |
| 10 | 45 | 20 | 10 | 25 | 5.17 | 4705 | 673 | 1897 |
| 11 | 50 | 20 | 0 | 30 | 5.22 | 4807 | 681 | 1918 |
| 12 | 48 | 7 | 5 | 40 | 5.09 | 4572 | 649 | 1875 |
| 13 | 35 | 45 | 12 | 8 | 5.11 | 4670 | 684 | 1919 |
| 14 | 40 | 50 | 7 | 3 | 5.18 | 4870 | 708 | 1962 |
| 15 | 40 | 5 | 50 | 3 | 5.20 | 4688 | 687 | 1875 |

Example 3. Evaluation of Performance of Refrigerant Mixture of HFC-32/HFC-125/HFC-143a/HFC-245cb The evaluated performances of the refrigerant mixture comprising HFC-32/HFC-125/HFC-143a/HFC-245cb at different weight percent of each constituents are described in Table 4, respectively. Referring to Table 4, it can be found that the performance of the compositions indicated in each item of Table 2 fall within the ranges between those of HFC407C and HFC-410A, so that the tested refrigerant mixture is useful as a substitute for HCFC-22.

TABLE 4

Evaluated performance of refrigerant mixture of HFC-32/HFC-125/HFC-143a/HFC-245cb

| Composition No. | HFC-32 (wt %) | HFC-125 (wt %) | HFC-143a (wt %) | HFC-245cb (wt %) | COP | VC (kJ/m$^3$) | $P_L$ (kPa) | $P_H$ (kpa) |
|---|---|---|---|---|---|---|---|---|
| 1 | 40 | 5 | 50 | 5 | 5.19 | 4633 | 676 | 1854 |
| 2 | 30 | 40 | 20 | 10 | 4.99 | 4360 | 641 | 1839 |
| 3 | 50 | 20 | 10 | 20 | 5.20 | 4630 | 652 | 1843 |
| 4 | 60 | 10 | 5 | 25 | 5.25 | 4720 | 655 | 1847 |
| 5 | 70 | 2 | 13 | 15 | 5.41 | 5040 | 701 | 1899 |
| 6 | 80 | 2 | 3 | 15 | 5.47 | 5180 | 712 | 1917 |
| 7 | 85 | 0 | 0 | 15 | 5.51 | 5235 | 716 | 1916 |
| 8 | 45 | 30 | 15 | 10 | 5.22 | 4739 | 678 | 1886 |
| 9 | 45 | 45 | 8 | 2 | 5.24 | 4946 | 712 | 1959 |
| 10 | 55 | 8 | 30 | 7 | 5.35 | 4927 | 701 | 1895 |
| 11 | 50 | 10 | 40 | 0 | 5.31 | 4940 | 714 | 1919 |
| 12 | 60 | 5 | 5 | 30 | 5.21 | 4908 | 638 | 1822 |
| 13 | 50 | 6 | 4 | 40 | 5.03 | 4180 | 576 | 1732 |

Example 4. Evaluation of Performance of Refrigerant Mixture of HFC-32/HFC-125/HFC-143a/R-600a The evaluated performances of the refrigerant mixture comprising HFC-32/HFC-125/HFC-143a/R-600a at different weight percent of each constituents are described in Table 5, respectively. Referring to Table 5, it can be found

TABLE 5

Evaluated performance of refrigerant mixture of HFC-32/HFC-125/HFC-143a/R600a

| Composition No. | HFC-32 (wt %) | HFC-125 (wt %) | HFC-143a (wt %) | R-600a (wt %) | COP | VC (kJ/m$^3$) | $P_L$ (kPa) | $P_H$ (kpa) |
|---|---|---|---|---|---|---|---|---|
| 1 | 40 | 20 | 30 | 10 | 5.08 | 4722 | 716 | 1947 |
| 2 | 45 | 10 | 40 | 5 | 5.20 | 4887 | 726 | 1953 |
| 3 | 40 | 30 | 30 | 0 | 5.20 | 4797 | 701 | 1919 |
| 4 | 38 | 35 | 20 | 7 | 5.10 | 4748 | 714 | 1955 |
| 5 | 48 | 15 | 35 | 2 | 5.26 | 4951 | 723 | 1946 |
| 6 | 50 | 5 | 43 | 2 | 5.28 | 4963 | 724 | 1940 |
| 7 | 45 | 0 | 40 | 15 | 5.02 | 4673 | 714 | 1946 |

Example 5. Evaluation of Performance of Refrigerant Mixture of HFC-32/HFC-125/HFC-143a/RC-318

The evaluated performances of the refrigerant mixture comprising HFC-32/HFC-125/HFC-143a/RC-318 at different weight percent of each constituents are described in Table 6, respectively. Referring to Table 6, it can be found that the performance of the compositions indicated in each item of Table 2 fall within the ranges between those of HFC407C and HFC-410A, so that the tested refrigerant mixture is useful as a substitute for HCFC-22.

TABLE 6

Evaluated performance of refrigerant mixture of HFC-32/HFC-125/HFC-143a/RC-318

| Composition No. | HFC-32 (wt %) | HFC-125 (wt %) | HFC-143a (wt %) | RC-318 (wt %) | COP | VC (kJ/m$^3$) | $P_L$ (kPa) | $P_H$ (kpa) |
|---|---|---|---|---|---|---|---|---|
| 1 | 35 | 30 | 25 | 10 | 5.11 | 4791 | 716 | 1970 |
| 2 | 45 | 20 | 30 | 5 | 5.23 | 4955 | 724 | 1967 |
| 3 | 48 | 10 | 40 | 2 | 5.28 | 4938 | 718 | 1933 |
| 4 | 30 | 15 | 40 | 15 | 5.00 | 4623 | 705 | 1952 |
| 5 | 40 | 30 | 30 | 0 | 5.20 | 4797 | 701 | 1919 |
| 6 | 43 | 0 | 50 | 7 | 5.22 | 4883 | 721 | 1943 |
| 7 | 40 | 35 | 20 | 5 | 5.17 | 4890 | 719 | 1972 |

Example 6. Evaluation of Performance of Refrigerant Mixture of HFC-32/HFC-125/HFC-143a/HFC-236ea The evaluated performances of the refrigerant mixture comprising HFC-32/HFC-125/HFC-143a/HFC-236ea at different weight percent of each constituents are described in Table 7, respectively. Referring to Table 7, it can be found that the performance of the compositions indicated in each item of Table 2 fall within the ranges between those of HFC407C and HFC-410A, so that the tested refrigerant mixture is useful as a substitute for HCFC-22.

TABLE 7

Evaluated performance of refrigerant mixture of HFC-32/HFC-125/HFC-143a/HFC-236ea

| Composition No. | HFC-32 (wt %) | HFC-125 (wt %) | HFC-143a (wt %) | HFC-236ea (wt %) | COP | VC (kJ/m$^3$) | $P_L$ (kPa) | $P_H$ (kpa) |
|---|---|---|---|---|---|---|---|---|
| 1 | 40 | 20 | 30 | 10 | 5.06 | 4487 | 646 | 1844 |
| 2 | 55 | 30 | 10 | 5 | 5.31 | 5076 | 722 | 1972 |
| 3 | 30 | 20 | 48 | 2 | 5.08 | 4467 | 663 | 1842 |
| 4 | 60 | 5 | 20 | 15 | 5.20 | 4781 | 671 | 1884 |
| 5 | 70 | 10 | 0 | 20 | 5.13 | 4789 | 661 | 1899 |
| 6 | 35 | 18 | 40 | 7 | 5.08 | 4457 | 650 | 1832 |
| 7 | 75 | 0 | 5 | 20 | 5.22 | 4902 | 677 | 1904 |
| 8 | 50 | 25 | 25 | 0 | 5.31 | 4994 | 718 | 1941 |

Example 7. Evaluation of Performance of Refrigerant Mixture of HFC-32/HFC-125/HFC-143a/R-600

The evaluated performances of the refrigerant mixture comprising HFC-32/HFC-125/HFC-143a/R-600 at different weight percent of each constituents are described in Table 8, respectively. Referring to Table 8, it can be found that the performance of the compositions indicated in each item of Table 2 fall within the ranges between those of HFC407C and HFC-410A, so that the tested refrigerant mixture is useful as a substitute for HCFC-22.

TABLE 8

Evaluated performance of refrigerant mixture of HFC-32/HFC-125/HFC-143a/R600

| Composition No. | HFC-32 (wt %) | HFC-125 (wt %) | HFC-143a (wt %) | RF-600 (wt %) | COP | VC (kJ/m$^3$) | $P_L$ (kPa) | $P_H$ (kpa) |
|---|---|---|---|---|---|---|---|---|
| 1 | 40 | 25 | 30 | 5 | 5.14 | 4708 | 698 | 1911 |
| 2 | 50 | 20 | 20 | 10 | 5.09 | 4711 | 693 | 1920 |
| 3 | 55 | 10 | 33 | 2 | 5.34 | 5042 | 728 | 1945 |
| 4 | 53 | 15 | 25 | 7 | 5.28 | 4970 | 726 | 1948 |
| 5 | 35 | 30 | 32 | 3 | 5.13 | 4635 | 689 | 1893 |
| 6 | 60 | 0 | 28 | 12 | 5.10 | 4797 | 705 | 1938 |
| 7 | 45 | 40 | 10 | 5 | 5.21 | 4886 | 715 | 1954 |
| 8 | 45 | 50 | 0 | 5 | 5.20 | 4920 | 717 | 1972 |
| 9 | 40 | 45 | 15 | 0 | 5.19 | 4859 | 708 | 1951 |

Example 8. Evaluation of Performance of Refrigerant Mixture of HFC-32/HFC-125/HFC-143a/HFE-134

The evaluated performances of the refrigerant mixture comprising HFC-32/HFC-125/HFC-143a/HFE-134 at different weight percent of each constituents are described in Table 9, respectively. Referring to Table 9, it can be found that the performance of the compositions indicated in each item of Table 2 fall within the range between those of HFC407C and HFC-410A, so that the tested refrigerant mixture is useful as a substitute for HCFC-22.

TABLE 9

Evaluated performance of refrigerant mixture of HFC-32/HFC-125/HFC-143a/HFE-134

| Composition No. | HFC-32 (wt %) | HFC-125 (wt %) | HFC-143a (wt %) | HFE-134 (wt %) | COP | VC (kJ/m$^3$) | $P_L$ (kPa) | $P_H$ (kpa) |
|---|---|---|---|---|---|---|---|---|
| 1 | 70 | 20 | 5 | 5 | 5.21 | 4904 | 675 | 1904 |
| 2 | 80 | 10 | 2 | 8 | 5.09 | 4766 | 647 | 1878 |
| 3 | 85 | 5 | 0 | 10 | 5.02 | 4665 | 629 | 1857 |
| 4 | 88 | 0 | 10 | 2 | 5.42 | 5248 | 721 | 1938 |
| 5 | 65 | 15 | 15 | 5 | 5.18 | 4815 | 669 | 1890 |
| 6 | 75 | 2 | 20 | 3 | 5.72 | 5054 | 702 | 1917 |
| 7 | 60 | 8 | 30 | 2 | 5.30 | 4950 | 700 | 1909 |
| 8 | 50 | 30 | 15 | 5 | 5.10 | 4619 | 649 | 1865 |
| 9 | 40 | 40 | 15 | 5 | 4.99 | 4440 | 632 | 1847 |
| 10 | 50 | 25 | 25 | 0 | 5.31 | 4994 | 718 | 1941 |

Example 9. Evaluation of Performance of Refrigerant Mixture of HFC-32/HFC-125/HFC-143a/HFE-245

The evaluated performances of the refrigerant mixture comprising HFC-32/HFC-125/HFC-143a/HFE-245 at different weight percent of each constituents are described in Table 10, respectively. Referring to Table 10, it can be found that the formance of the compositions indicated in each item of Table 2 fall within the ranges between those of HFC407C and HFC-410A, so that the tested ant mixture is useful as a substitute for HCFC-22.

TABLE 10

Evaluated performance of refrigerant mixture of HFC-32/HFC-125/HFC-143a/HFE-245

| Composition No. | HFC-32 (wt %) | HFC-125 (wt %) | HFC-143a (wt %) | HFE-245 (wt %) | COP | VC (kJ/m$^3$) | $P_L$ (kPa) | $P_H$ (kpa) |
|---|---|---|---|---|---|---|---|---|
| 1 | 40 | 40 | 15 | 5 | 5.03 | 4545 | 655 | 1881 |
| 2 | 80 | 5 | 5 | 10 | 5.10 | 4868 | 674 | 1921 |
| 3 | 70 | 10 | 12 | 8 | 5.24 | 4952 | 690 | 1920 |
| 4 | 60 | 0 | 38 | 2 | 5.37 | 5047 | 719 | 1924 |
| 5 | 50 | 25 | 20 | 5 | 5.20 | 4795 | 683 | 1902 |
| 6 | 50 | 32 | 13 | 5 | 5.19 | 4807 | 683 | 1912 |
| 7 | 52 | 15 | 30 | 3 | 5.31 | 4921 | 703 | 1909 |
| 8 | 85 | 7 | 0 | 8 | 5.47 | 5289 | 725 | 1946 |
| 9 | 65 | 15 | 15 | 5 | 5.26 | 4980 | 707 | 1936 |
| 10 | 50 | 25 | 25 | 0 | 5.31 | 4994 | 718 | 1941 |

As apparent from the above description, the present invention provides a refrigerant composition, which is useful as a substitute for HCFC-22, produced by mixing additionally any one component of RC-270, HFC-227ea, HFC-245cb, R-600a, RC-318, HFC-236ea, R-600, HFE-134 and HFE-245 with a mixture of HFC-32, HFC-125 and HFC-143a. The refrigerant composition according to the present invention has an advantage in that it does not damage the ozone layer, so there is no possibility of restricted in use in the future. The above materials, which are components of the refrigerant composition according to the present invention, are currently commercially available, or active research for those materials is being conducted to make them commercially available in the near future.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A refrigerant composition useful as a substitute for chlorodifluoromethane, consisting of:

a first constituent of difluoromethane;

a second constituent of pentafluoroethane;

a third constituent of 1,1,1-trifluoroethane; and a fourth constituent of cyclopropane.

2. The refrigerant composition, according to claim 1, wherein the first constituent is 15 to 60% by weight, the second constituent is a non-zero amount up to 50% by weight, the third constituent is 20 to 70% by weight, and the fourth constituent is a non-zero amount up to 15% by weight.

3. The refrigerant composition according to claim 2, wherein the second constituent is 2 to 50% by weight and the fourth constituent is 2 to 15% by weight.

4. The refrigerant composition of claim 1, wherein said composition consists of 25 to 45% by weight of difluoromethane, 2 to 35% by weight of pentafluoroethane, 28 to 60% by weight of 1,1,1-trifluoroethane and 2 to 10% by weight of cyclopropane.

5. A refrigerant composition useful as a substitute for chlorodifluoromethane, comprising difluoromethane, pentafluoroethane, 1,1,1-trifluoroethane and cyclopropane.

6. The refrigerant composition of claim 5, comprising 15 to 60% by weight difluoromethane, a non-zero amount up to 50% by weight pentafluoroethane, 20 to 70% by weight 1,1,1-trifluoroethane and a non-zero amount up to 15% by weight cyclopropane.

7. The refrigerant composition according to claim 6, comprising 2 to 50% by weight pentafluoroethane and 2 to 15% by weight cyclopropane.

8. The refrigerant composition of claim 6, comprising 25 to 45% by weight difluoromethane, 2 to 35% by weight pentafluoroethane, 28, to 60% by weight 1,1,1-trifluoroethane and a non-zero amount up to 10% by weight cyclopropane.

9. The refrigerant composition of claim 8, comprising 25 to 45% by weight difluoromethane, 2 to 35% by weight pentafluoroethane, 28 to 60% by weight 1,1,1-trifluoroethane and 2 to 10% by weight cyclopropane.

* * * * *